United States Patent
Lu et al.

(10) Patent No.: US 8,060,036 B2
(45) Date of Patent: Nov. 15, 2011

(54) WIRELESS TERMINAL DEVICE AND METHOD OF ESTABLISHING COMMUNICATION CONNECTION WITH AN ACCESS POINT

(75) Inventors: Chi-Ming Lu, Taipei Hsien (TW); Dong-Ming Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 461 days.

(21) Appl. No.: 12/331,371

(22) Filed: Dec. 9, 2008

(65) Prior Publication Data
US 2009/0154416 A1 Jun. 18, 2009

(30) Foreign Application Priority Data
Dec. 14, 2007 (CN) .......................... 2007 1 0203084

(51) Int. Cl.
*H03C 1/62* (2006.01)
*H04B 17/00* (2006.01)
(52) U.S. Cl. .................. 455/115.1; 455/422.1; 455/424; 455/525
(58) Field of Classification Search .................. 455/424, 455/525, 422.1, 115.1
See application file for complete search history.

(56) References Cited

U.S. PATENT DOCUMENTS

| 7,388,929 | B2 * | 6/2008 | Roy ............................. 375/297 |
| 2003/0054813 | A1 * | 3/2003 | Riley et al. .................... 455/424 |
| 2005/0070293 | A1 | 3/2005 | Tsukiji et al. |
| 2006/0040702 | A1 * | 2/2006 | Willenegger et al. ......... 455/525 |
| 2006/0088081 | A1 * | 4/2006 | Withington et al. .......... 375/130 |
| 2007/0259659 | A1 * | 11/2007 | Bennett ..................... 455/422.1 |
| 2008/0192699 | A1 * | 8/2008 | Rue ............................. 370/331 |
| 2008/0198826 | A1 * | 8/2008 | Won ............................. 370/338 |

FOREIGN PATENT DOCUMENTS
TW          093135969          6/2006
* cited by examiner

*Primary Examiner* — Jean Jeanglaude
(74) *Attorney, Agent, or Firm* — Altis Law Group, Inc.

(57) ABSTRACT

A mobile terminal device includes a detector, a transceiver, an analyzer, an execution module, and a connection module. The detector generates a probing request signal. The transceiver receives signals sent from a plurality of access points (AP). The analyzer retrieves a plurality of Received signal strength Indications (RSSI) of the plurality of APs and workload of the plurality of APs by analyzing the signals. The execution module generates a plurality of indices of the plurality of APs based on an analysis results, and selects one of the plurality of indices as a best comprehensive index. The connection module establishes a connection between an AP corresponding to the best comprehensive index and the mobile terminal device.

20 Claims, 5 Drawing Sheets

WIRELESS TERMINAL DEVICE AND METHOD OF ESTABLISHING COMMUNICATION CONNECTION WITH AN ACCESS POINT

BACKGROUND OF THE INVENTION

1. Field of the Invention

The present invention relates to wireless communication equipment, in particular, to a wireless terminal and method thereof for connecting to base stations.

2. Description of Related Art

Base stations are widely deployed as access points to facilitate wireless access to the Internet for portable terminal devices. Each base station typically provides services to a limited number of terminals to prevent overloading a base station, which causes serving terminal disconnections and interruptions during data communication.

Generally, a wireless terminal device selects a base station with the highest received signal strength indication (RSSI) to connect to while disregarding base station workloads. If a majority of wireless terminals connects to the same base station with the highest RSSI, this increases the burdens of the base station, and may even cause interruption to its communication. Terminals trying to reestablish connection with the base station may waste unnecessary time attempting and failing to reconnect to the base station.

SUMMARY

Other advantages and novel features of the present invention will become more apparent from the following detailed description when taken in conjunction with the accompanying drawings, in which:

An exemplary embodiment of a wireless terminal device for communicating with one of a plurality of base stations comprises a detector, a transceiver, an analyzer, an execution module, and a connection module. The detector generates probe requests. The transceiver transfers the probe requests to and receives signals from the plurality of base stations, wherein the received signals comprise data packets and beacons. The analyzer analyzes the signals to obtain workload indices and received signal strength indications (RSSIs) of the plurality of base stations at the wireless terminal device as analysis results. The execution module generates comprehensive indices for the plurality of base stations according to the analysis results, wherein each base station corresponds to one index. The execution module processes the indices for selecting one processed index as the best comprehensive index. The connection module establishes wireless communication between the wireless terminal device and a base station corresponding to the best comprehensive index.

An exemplary embodiment of a method for establishing communication between a wireless terminal device and one of a plurality of base stations is provided and comprises the following steps: A plurality of probe requests are transmitted to the plurality of the base stations. Signals comprising data packets and beacons are received as responses of the probe requests from the plurality of base stations and are utilized to obtain the workload indices of the base stations and received signal strength index (RSSI) of signals from the base stations at the terminal device through signal analysis. Comprehensive indices for the plurality of base stations are generated according to the result of the analysis, and each base station corresponds to one index. The comprehensive indices are processed and one processed index is selected as the best comprehensive index. Wireless communication is accordingly established between the terminal device and a base station corresponding to the best comprehensive index.

The presented device and the connection method thereof analyzes all the base stations and selects the best one before connecting thereto, thus avoiding sequential connection attempts to each of the base stations, reducing time consumed during the connection attempts, and balancing base station workloads by ameliorating competition conditions among devices concurrently connecting to one base station.

DETAILED DESCRIPTION

Figure 1:
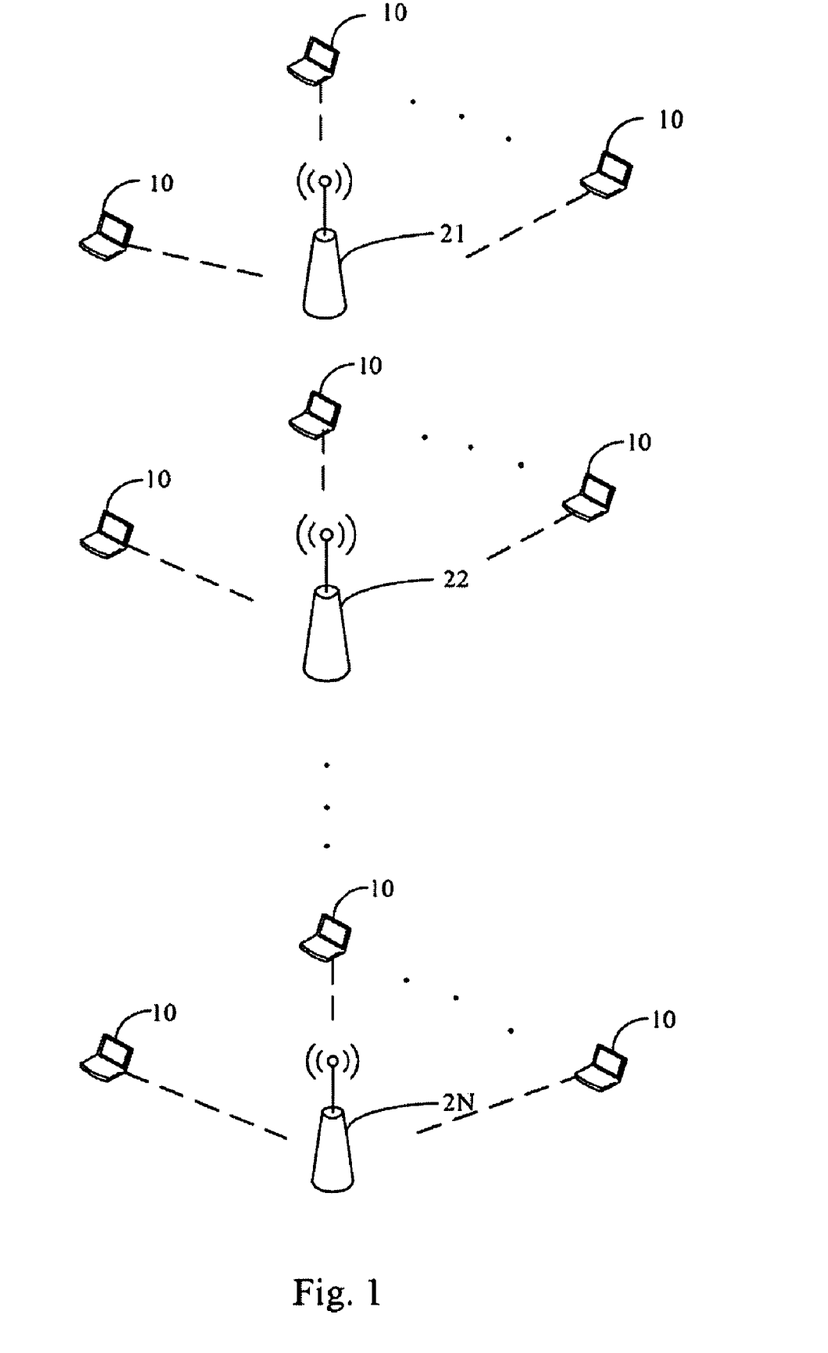
FIG. 1 is a schematic view of an environment to which an embodiment of a wireless terminal device is applied.

With reference to FIG. 1, a schematic view of an environment for applying an embodiment of a wireless terminal device 10 is shown. In the embodiment, a plurality of terminal devices and a first base stations 21, a second base station 22, . . . and an N-th base station 2N constitute a wireless network, wherein the base stations may utilize the same or different wireless communication channels. In the embodiment, the wireless network comprises 13 channels, and the wireless terminal device 10 may comprise a portable electronic device, such as a portable computer, a wireless mobile phone, for example.

Figure 2:
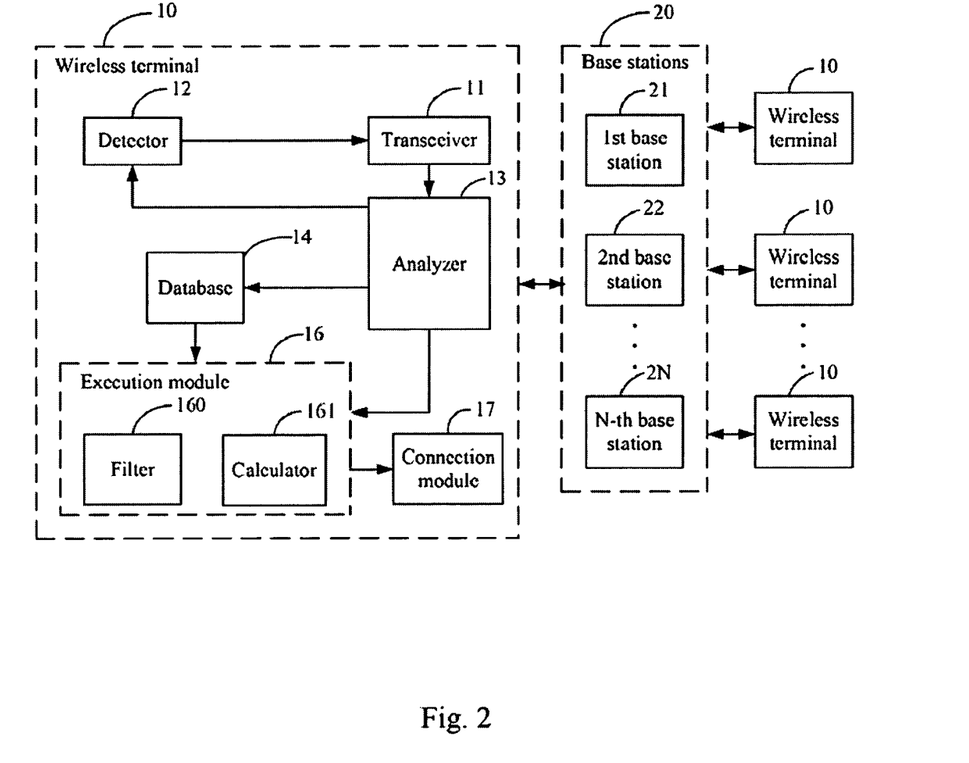
FIG. 2 is a block diagram of the configuration of an embodiment of the wireless terminal device.

A plurality of wireless terminal devices 10 is distributed among the first base station 21, the second base station 22, . . . and the N-th base station 2N, such that the base stations are capable of simultaneously serving the plurality of wireless terminal devices 10 for wireless communication. In the embodiment, each of the wireless terminal devices 10 can only be connected to one of the first base station 21, the second base station 22, . . . and the N-th base station 2N. In the embodiment, when a yet-to-be-connected device 10 is to connect to one of the base stations 21~2N, the device delivers probe requests to base stations 21~2N and, in return, receives data packets, probe responses, and beacons from the base stations, and establishes a connection based on RSSIs which are obtained through signal analysis. In the embodiment, the data packets comprise data transmitted between base stations 21~2N and data transmitted between devices 10 and base stations 21~2N. Upon receiving the probe requests, base stations 21~2N return probe responses and beacon packets to devices 10. In the embodiment, each beacon corresponds to a base station, and each device 10 can measure RSSI and channel information of the base station utilizing the beacon. FIG. 2 is a block diagram of the configuration of an embodiment of a wireless terminal device 10. In the embodiment, device 10 comprises a transceiver 11, a detector 12, an analyzer 13, a database 14, an execution module 16, and a connection module 17. The transceiver 11 may comprise circuits and other hardware necessary for transmitting and receiving wireless signals, including but not limited to one or more antennas, baseband circuits, and radio frequency (RF) circuits. The database 14 may comprise but not limited to memory and computer program for managing records in the memory. The memory, for example, may comprise random access memory, nonvolatile memory, such as flash memory, and/or a mass storage device. Each of the detector 12, analyzer 13, and execution module 16 may be implemented by computer programs, circuits, or the combination thereof. The computer programs, when loaded and executed by a processing unit of the a wireless terminal device 10, directs the wireless terminal device 10 corresponding functions of detector 12, analyzer 13, database 14, and execution module 16 detailed in the following paragraphs. The circuits and the processing unit may be implemented by integrated circuits (ICs) and partly or entirely packaged as one or more chips.

When a channel is about to be detected, the detector 12 initializes the channel, and generates and transmits a probe request to the transceiver 11. In the embodiment, the number of channels is 13 in total, and the detector 12 sequentially detects one channel per iteration.

The transceiver 11 is coupled to the detector 12, receives probe requests from the detector 12, transfers the probe requests to the base stations 20 through the initialized channels, and within a predetermined period receives data packets, probe responses, and beacon packets sent by the base stations 20 through the channels, and relays the same to the analyzer 13. In the embodiment, the predetermined period is 30 seconds, 13 channels are available in total, and the transceiver 11 upon receiving each probe request transfers the probe request to a corresponding initialized channel.

Base stations 20 comprise base stations 21~2N which may communicate through the same channel or different channels.

The analyzer 13 is coupled to the transceiver 11, and receives and analyzes beacon packets and data packets from the transceiver 11. In the embodiment, the analyzer 13 anatomizes the beacon packets to obtain the RSSIs and channel information of the respective base stations, and obtains from the data packets the workloads of the base stations. In the embodiment, each beacon corresponds to a base station, device 10 can utilize the beacon to detect signal strength and channel information of the base station, and the analyzer 13 assesses signal strength of the beacon to retrieve RSSI corresponding to the base station, parses an address field in at least one beacon packet to retrieve channel information of the base station, and stores RSSI and channel information of the base station in the database 14.

In the embodiment, the analyzer 13 parses address fields in the data packets to retrieve the number of devices 10 connected to each base station 20 as an indicator of the workload thereof, i.e. the number of devices 10 connected to their respective base stations 21~2N. In the embodiment, the analyzer 13 looks up "To DS" and "From DS" values in frame control fields in the data packets to retrieve the addresses of base stations 20 and source addresses and destination addresses of the data packets, and in turn the number of devices 10 connected to each base station 20. One embodiment of a data packet comprising fields of "To DS", "From DS", "Address 1", "Address 2", "Address 3" and "Address 4", and the interrelation thereof is shown in the following table 1:

TABLE 1

| To DS | From DS | Address 1 | Address 2 | Address 3 | Address 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

Table 1 shows interrelation between "To DS", "From DS" fields, and "Address 1", "Address 2", "Address 3", and "Address 4" fields in the data packets. Destination address (DA) denotes a media access control (MAC) address of a destination recipient of a data packet. Source address (SA) denotes a MAC address of a transmitter of the data packet. Basic service set ID (BSSID) denotes a MAC address of an access point (AP). Receiver address (RA) denotes a MAC address of an intermediate receiver for relaying the data packet. Transmitter address (TA) denotes a MAC address of a transmitter sending the data packet to wireless medium. In the embodiment, the analyzer 13 reads values of "Address 1", "Address 2", and "Address 3" fields if values of "To DS" and "From DS" fields are respectively 0 and 0, reads values of Address 1" and "Address 2" fields if values of "To DS" and "From DS" fields are respectively 0 and 1, reads values of Address 1" and "Address 2" fields if values of "To DS" and "From DS" fields are respectively 1 and 0, and reads none of the address fields if values of "To DS" and "From DS" fields are respectively 1 and 1.

In the embodiment of data packets analysis by the analyzer 13, when a set of the data packets comprises the same BSSID value but different DA or SA values, the count of the different DA values plus the count of the different SA yields the number of devices 10 connected to a base station 20 corresponding to the BSSID. Counting of the different DA or SA values excludes redundant counting of the same DA or SA values in the set of data packets.

In the embodiment, the analyzer 13 stores the obtained number of devices 10 connected to the base station 20 on the database 14.

The database 14 is coupled to the analyzer 13 and stores analysis results received from the analyzer 13. In the embodiment, the analysis results comprise, for each of the base stations 20, the analyzed RSSI, channel information thereof, and the obtained number of devices 10 connected thereto. That is, base stations correspond one-to-one with records of analysis results, each comprising RSSI, channel information, and the number of connected devices 10.

The analyzer 13 further determines if all channels have been detected for the previously described process. In the embodiment, the analyzer 13 finishes the determination by identifying the channels utilized by the base stations 20. If the channels have not been completely detected for the previously described process, the analyzer 13 sends a probe request to the detector 12, thus triggering the detector 12 to continue the previously described detection for responding to the request. If the channels have been completely detected for the previously described process, the analyzer 13 sends an execution instruction to the execution module 16.

The detector 12 is coupled to the analyzer 13, receives probe requests from the analyzer 13, and in response, initializes each channel under detection, and generates and sends probe requests to transceiver 11.

The execution module 16 is coupled to the database 14 and the analyzer 13. The execution module 16 generates indices of the base stations based on the analysis results yielded from the analyzer 13. Each base station corresponds to one of such indices. Upon receiving the execution instruction from the analyzer 13, the execution module 16 retrieves records of the analysis results from the database 14 for further processing and calculation to obtain a best comprehensive index from processed records of the analysis results. In the embodiment, the execution 16 provides processed RSSIs as the indices. The execution module 16 further comprises a filter 160 and a calculator 161.

The filter 160 is coupled to database 14, retrieves the records of RSSI and channel information, along with the number of connected devices 10 per base station 20, and filters out records in which RSSI is lower than a predefined level. In the embodiment, RSSIs are classified into "Poor", "Fair", "Good", or "Excellent". For example, the predefined level may be the "Good" level. In an example of a mobile phone with a four-scale received signal strength display, "Poor" represents one on the scale of received signal strength, "Fair" represents two on the scale of received signal strength, "Good" represents three on the scale of received signal strength, and "Excellent" represents four on the scale of received signal strength.

In the embodiment, the filter 160 determines if RSSIs of all base stations 20 are lower than the predefined level. In the embodiment, the filter 160 determines if the number of the consequent records passing the filtering is equal to zero to check if RSSIs of all base stations 20 are lower than the predefined level. No record passing the filtering implies that RSSIs of all base stations are lower than the predefined level. If all base stations are lower than the predefined level, the filter 160 selects the highest RSSIs among all of the base stations 20 as the best comprehensive index and sends the result of the best comprehensive index determination process to connection 17 for setting up connections. If the number of the consequent records passing the filtering is not zero, this consequence shows that RSSIs of one or more base stations are higher than the predefined level. The filter 160 sends the results of the filtering to the calculator 161.

The calculator 161 is coupled to the filter 160, receives the results of the filtering from the filter 160, and adjusts the filtered RSSIs of the base stations 20 to obtain the comprehensive indices of the base stations 20 from the adjustment. In the embodiment, the calculator 161 adjusts the filtered RSSIs of the base stations 20 according to a formula. In the embodiment, the formula is shown in the following:

$$RSSI' = \begin{cases} RSSI/(k \times \log(n)) & (n \geq 10) \\ RSSI & (1 \leq n < 10) \end{cases} \quad (1)$$

in which RSSI' stands for the adjusted RSSI, RSSI stands for original RSSI, n is the number of devices 10 connected to one of the base stations 21~2N corresponding to the RSSI, k is an adjustable value varying with the number of base stations 20, for example, the value of k is increased when the number of base stations 20 is increased, and value of k is constant, such as 1 or 2, when the number of base stations 20 remains the same. An example is given in the following with respect to the first base station 21, in which if n is smaller than 10, i.e. if the number of devices 10 connected to the first base station 21 is less than 10, RSSI of the first base station 21 is not required to be adjusted, and if n is greater than 10, i.e. if the number of devices 10 connected to the first base station 21 is more than 10, RSSI of the first base station 21 is required to be adjusted according to the formula (1). RSSI adjustment for the second base station 22, . . . and the N-th base station 2N is similar to that of the first base station 21, and thus is omitted.

In the embodiment, the calculator 161 further determines if the maximum among the adjusted RSSI is achieved by more than one RSSI' having the same value. If the maximum among the adjusted RSSI is achieved by more than one RSSI' having the same value, the calculator 161 selects one of the maximum RSSI's obtained from the highest pre-adjust RSSI as the best comprehensive index, and sends a record of analysis result corresponding to the best comprehensive index to the connection module 17 for initiating a connection. If the maximum among the adjusted RSSI comprises only one RSSI', the calculator 161 selects the maximum as the best comprehensive index, and sends a record of analysis result corresponding to the best comprehensive index to the connection module 17.

The connection module 17 is coupled to filter 160 and is configured for receiving a record of analysis result corresponding to the best comprehensive index, and establishes a wireless connection between the device 10 in FIG. 2 and a base station corresponding to the best comprehensive index.

Figure 3:
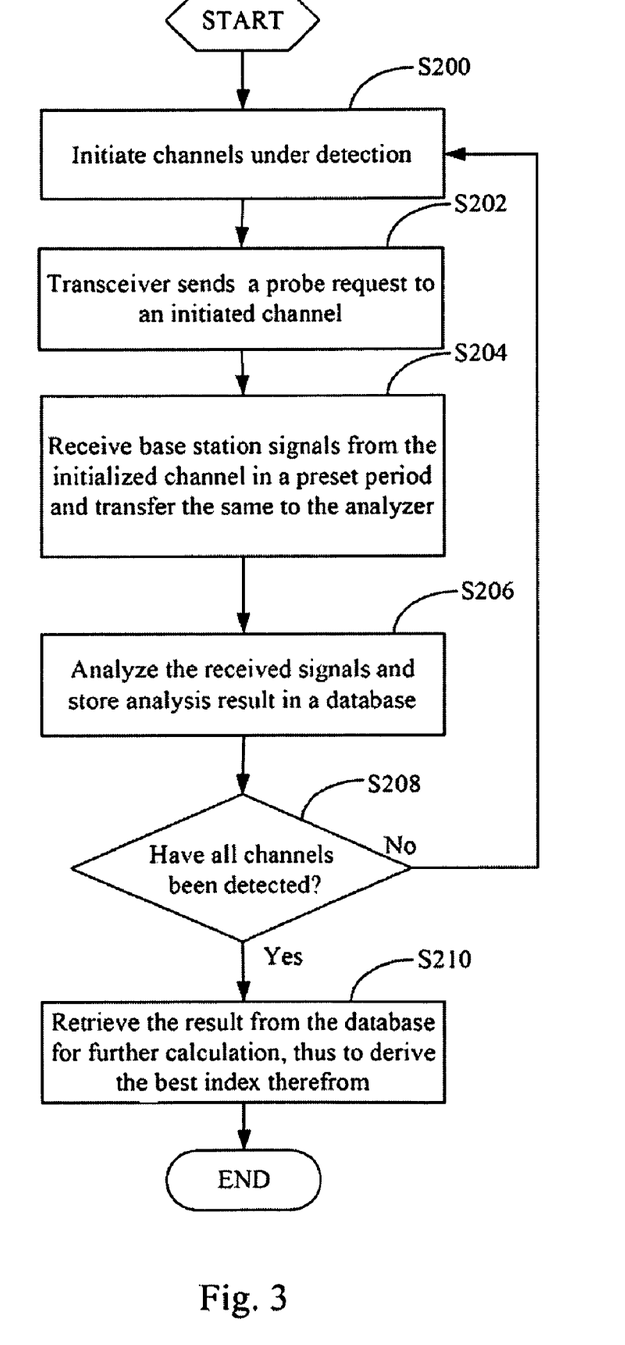
FIG. 3 is a flowchart of a connection method executed by an embodiment of the wireless terminal device.

FIG. 3 is a flowchart of an exemplary embodiment of a connection method.

In step S200, prior to detecting a channel, the detector 12 initializes the channel. For example, the detector 12 initializes the first channel. Similarly, the detector 12 sequentially initializes one channel for each detection.

In step S202, the detector 12 generates and transmits a probe request to the transceiver 11, and the transceiver 11 transfers the probe requests to the initialized channel. In the embodiment, the transceiver 11, upon receiving each probe request, transfers the probe request through the corresponding initialized channel to a base station utilizing the channel.

In step S204, the transceiver 11, within a predetermined period, receives data packets and signals from the initialized channel, including data packets, probe responses, and beacon packets sent by the base stations 20, and relays the same to the analyzer 13. In the embodiment, the predetermined period is 30 seconds, and the data packets comprise data transmitted between base stations 21~2N and data transmitted between devices 10 and base stations 21~2N.

In step S206, the analyzer 13 analyzes received beacon packets and data packets and stores the results of the analysis in the database 14. In the embodiment, each beacon corresponds to one base station and comprises signal strength and channel information thereof, and the analyzer 13 assesses signal strength of the beacon to retrieve RSSI corresponding to the base station, parses an address field in the beacon packet to retrieve channel information of the base station, and stores RSSI and channel information of the base station in the database 14.

As previously described, the analyzer 13 may parse address fields in the data packets to retrieve the number of devices 10 connected to each base station 20 as an indicator of the workload thereof, i.e. the number of devices 10 connected to respective one of base stations 21~2N.

The analyzer 13 then stores the obtained number of devices 10 connected to the base station 20 on the database 14 as a workload indicator of the base station 20.

In step S208, the analyzer 13 further determines if all channels have been detected for the previously described process. In the embodiment, the analyzer 13 determines if all channels have been detected by identifying the channels utilized by the base stations 20. If the channels have not been completely detected for the previously described process, the analyzer 13 sends a probe request to the detector 12, thus to trigger the detector 12 to continue the previously described detection for responding to the request and perform step S200.

If the channels have been completely detected for the previously described process, the analyzer 13 sends an execution instruction to the execution module 16. In the step S210, the execution module 16 retrieves the analysis results from database 14, processes and calculates on the analysis results, and obtains a best comprehensive index from the processed analysis results. In the embodiment, a record of the analysis results comprises RSSI and channel information, along with the number of connected devices 10 per base station 20. In the embodiment, the execution 16 provides processed RSSIs as the indices.

Figure 4:
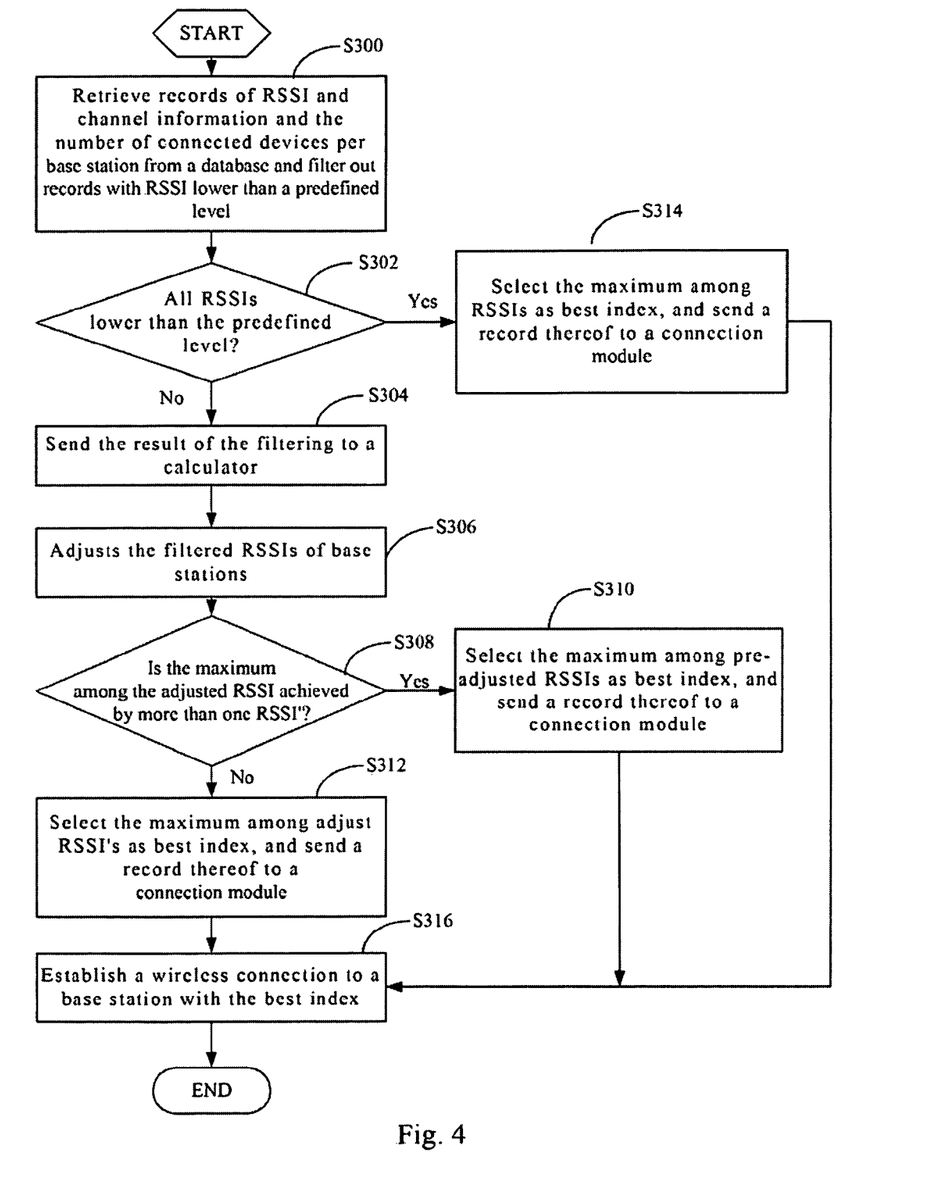
FIG. 4 is a flowchart of a detailed exemplary embodiment of step S210 in FIG. 3.

FIG. 4 is a flowchart of a detailed exemplary embodiment of step S210 in FIG. 3. In step S300, the filter 160 retrieves the records of RSSI and channel information, along with the number of connected devices 10 per base station 20 from database 14 and filters out records with RSSI lower than a predefined level.

In the step S302, the filter 160 determines if RSSIs of all base stations 20 are lower than the predefined level. In the embodiment, the filter 160 determines if the number of the consequent records passing the filtering is equal to zero to check if RSSIs of all base stations 20 are lower than the predefined level.

If no record passes the filtering, that is RSSIs of all base stations are lower than the predefined level, step S314 is then performed, and the filter 160 selects the highest RSSIs among all of the base stations 20 as the best comprehensive index and sends analysis results corresponding to the best comprehensive index to connection 17 for setting up connections.

If the number of the consequent records passing the filtering is not zero, this condition shows that RSSIs of one or more base stations are higher than the predefined level, and step S304 is accordingly performed, wherein the filter 160 sends the result of the filtering to the calculator 161.

In step S306, the calculator 161 adjusts the filtered RSSIs of the base stations 20 to obtain the indices of the base stations 20 through the adjustment. In the embodiment, the calculator 161 adjusts the filtered RSSIs of the base stations 20 according to previously described formula (1).

In step S308, the calculator 161 further determines if the maximum among the adjusted RSSI is achieved by more than one RSSI' having the same value.

If the maximum among the adjusted RSSI is achieved by more than one RSSI' having the same value, step S310 is performed, the calculator 161 selects a maximum adjusted RSSI obtained from the highest pre-adjust RSSI as the best comprehensive index, and sends a record of analysis results corresponding to the best comprehensive index to the connection module 17 for initiating a connection.

If the maximum among the adjusted RSSI comprises only one RSSI', step S312 is performed, and the calculator 161 selects the maximum as the best comprehensive index, and sends a record of analysis results corresponding to the best comprehensive index to the connection module 17 for initiating a connection.

In step S316, the connection module 17 establishes a wireless connection to a base station corresponding to the best comprehensive index.

Figure 5:
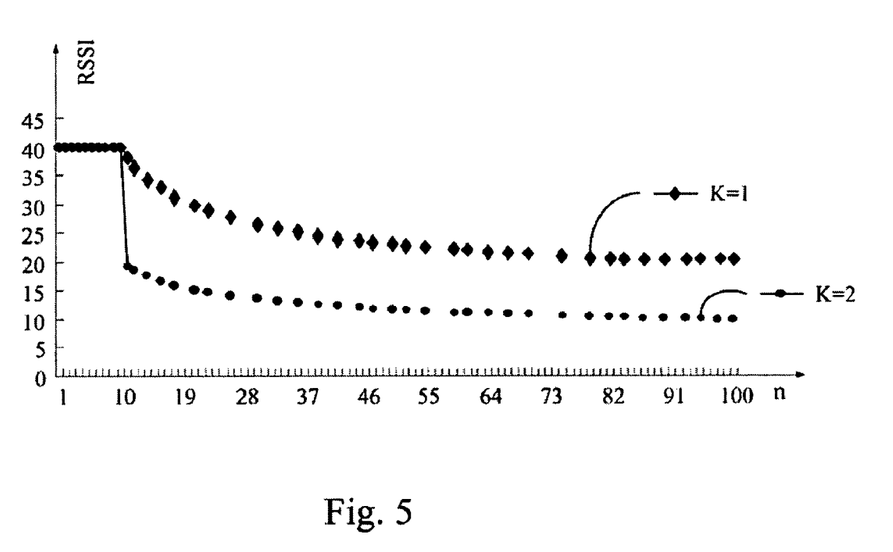
FIG. 5 is an exemplary schematic diagram of adjusted RSSIs.

FIG. 5 is an exemplary schematic diagram of adjusted RSSIs, showing adjusted RSSIs corresponding to k=1 and k=2. As the value of n grows, the adjusted RSSI decreases, and vice versa.

The presented device and the connection method thereof avoids sequential connection attempts to each of the base stations 20 by analyzing all the base stations 20 and selecting the best one before connecting thereto, thereby reducing time consumed during the connection attempts and balancing base station workloads by ameliorating competition conditions among devices concurrently connecting to one base station.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wireless terminal device for communicating with one of a plurality of base stations, comprising:
   a detector for generating at least one probe request to detect at least one of a plurality of channels communicating the wireless terminal device with the plurality of base stations;
   a transceiver for transferring the at least one probe request to and receiving signals in addition to probe responses of the at least one probe request from the plurality of base stations, the received signals comprising data packets and beacons;
   an analyzer for analyzing the received signals to obtain workload indices and received signal strength indications (RSSIs) of the plurality of base stations at the wireless terminal device as analysis result, and analyzing address fields in the data packets to retrieve the number of terminal devices connected to respective one of the plurality of base stations as the workload indices of the plurality of base stations;
   an execution module configured for generating a comprehensive index for each of the plurality of base stations according to the analysis result, thus generating comprehensive indices of the plurality of base stations, and for finding a best comprehensive index from the generated comprehensive indices of the plurality of base stations; and
   a connection module configured for establishing wireless communication between the wireless terminal device and the base station corresponding to the best comprehensive index.

2. The wireless terminal device as described in claim 1, wherein the analysis result shows RSSI and channel information of each of the plurality of base stations, and the number of terminals connected to each of the plurality of base stations.

3. The wireless terminal device as described in claim 2, wherein the analyzer assesses signal strength of the beacons to retrieve RSSIs corresponding to the plurality of base stations and parses address fields of the beacons to retrieve channel information of the plurality of base stations.

4. The wireless terminal device as described in claim 2, wherein the analyzer obtains the number of devices connected to respective one of the plurality of base stations by adding count of different destination addresses and count of different source addresses in a set of the data packets comprising the same basic service set identification (BSSID), wherein the destination and source addresses are media access control (MAC) addresses.

5. The wireless terminal device as described in claim 2, wherein the analyzer determines whether all channels have been detected based on the channel information of the plurality of base stations.

6. The wireless terminal device as described in claim 5, wherein the analyzer sends a detection instruction to the detector if not all of the channels have been detected.

7. The wireless terminal device as described in claim 6, wherein the detector in response to the detection instruction further issues another probe request to the transceiver.

8. The wireless terminal device as described in claim 5, wherein the analyzer sends an execution instruction to the execution module if all channels have been detected.

9. The wireless terminal device as described in claim 1, wherein the execution module further comprises:

a filter for filtering out RSSIs of the plurality of base stations lower than a threshold and determining whether RSSIs of all base stations are lower than the threshold; and a calculator for adjusting the filtered RSSIs if RSSIs of all base stations are not entirely lower than the threshold.

10. The wireless terminal device as described in claim 9, wherein if the RSSIs of all base stations are lower than the threshold, the filter selects the highest RSSI of one base station as the best comprehensive index.

11. The wireless terminal device as described in claim 10, wherein the calculator identifies the maximum RSSI value among the adjusted RSSIs, and determines if more than one of the adjusted RSSIs have the same value identified as the maximum RSSI value.

12. The wireless terminal device as described in claim 11, wherein if a plurality of the adjusted RSSIs achieving the maximum RSSI value, the calculator selects one from the plurality of the adjusted RSSIs derived from the greatest original RSSI value as the best comprehensive index.

13. The wireless terminal device as described in claim 11, wherein if the adjusted RSSIs have different values, the calculator selects the greatest one of the adjusted RSSIs as the best comprehensive index.

14. A method for establishing communication between a wireless terminal device and one of a plurality of base stations, executable in the wireless terminal device, comprising:
transmitting probe requests to the plurality of the base stations;
receiving signals in addition to probe responses of the probe requests from the plurality of base stations, comprising data packets and beacons;
deriving the workload indices of the plurality of base stations and received signal strength indication (RSSI) of signals from the plurality of base stations at the terminal device through signal analysis, wherein the deriving comprises analyzing address fields in the data packets to retrieve the number of terminal devices connected to respective one of the plurality of base stations as the workload indices of the plurality of base stations;
generating comprehensive indices for the plurality of base stations according to the results of the analysis, each base station corresponding to one index;
processing on the comprehensive indices for selecting one index from the comprehensive indices as the best comprehensive index; and
establishing wireless communication between the terminal device and a base station corresponding to the best comprehensive index.

15. The method as described in claim 14, wherein the result of the analysis shows RSSIs and channel information of each of the plurality of base stations, and the number of terminals connected to each of the plurality of base stations.

16. The method as described in claim 14, further comprising:

inspecting signal strength of the beacons to retrieve RSSIs corresponding to the plurality of base stations;
analyzing address fields in respective packets of the beacons to retrieve channel information of the plurality of base stations;
analyzing address fields in the data packets to retrieve the number of terminal devices connected to the respective base stations as the workload indices thereof;
determining whether all channels communicating the wireless terminal device with the plurality of base stations have been detected; and
storing the result of the analysis in a database.

17. The method as described in claim 14, further comprising:
obtaining the number of devices connected to respective one of the plurality of base stations by adding count of different destination addresses and count of different source addresses in a set of the data packets comprising the same basic service set identification (BSSID), wherein the destination and source addresses are media access control (MAC) addresses.

18. The method as described in claim 14, further comprising:
retrieving the result of the analysis from the database;
filtering out RSSIs of the plurality of base stations lower than a threshold;
determining whether RSSIs of all base stations are lower than the threshold;
if RSSIs of all base stations are lower than the threshold, selecting the maximum RSSI as the best comprehensive index; and
transmitting an analysis result corresponding to the best comprehensive index to a connection module.

19. The method as described in claim 18, further comprising:
if RSSIs of base stations are not entirely lower than the threshold, adjusting the filtered RSSIs;
determining whether more than one of the adjusted RSSIs have the same value identified as the maximum among the adjusted RSSIs;
if more than one of the adjusted RSSIs have the same value identified as the maximum among the adjusted RSSIs, selecting one of the maximum adjusted RSSIs derived from the greatest original RSSI value as the best comprehensive index; and
transmitting an analysis result corresponding to the best comprehensive index to the connection module.

20. The method as described in claim 19, further comprising:
if the adjusted RSSIs have different values, selecting the maximum adjusted RSSIs as the best comprehensive index; and
transmitting an analysis result corresponding to the best comprehensive index to the connection module.

* * * * *